UNITED STATES PATENT [19]

Layh

[11] Patent Number: 4,780,655

[45] Date of Patent: Oct. 25, 1988

[54] DRIVE AND POSITION SENSOR FOR A DRIVEN PART

[76] Inventor: Hans-Dieter Layh, Zachersweg 17, D-7121 Gemmringheim, Fed. Rep. of Germany

[21] Appl. No.: 64,131

[22] Filed: Jun. 19, 1987

[30] Foreign Application Priority Data

Jun. 20, 1986 [DE] Fed. Rep. of Germany ....... 3620796

[51] Int. Cl.[4] .......................... G05D 3/10; G05G 5/00

[52] U.S. Cl. .................................... 318/468; 318/626; 318/657

[58] Field of Search ............... 318/160, 437, 470, 466, 318/667, 468, 558, 626, 647, 652, 653, 656, 657

[56] References Cited

U.S. PATENT DOCUMENTS 2,516,092 7/1950 Roessler .......................... 318/657 X
3,015,768 1/1962 Hornfeck et al. ............. 318/657 X
3,939,389 2/1976 Nopper ........................... 318/657 X
4,019,131 4/1977 Yamada et al. ................. 318/653 X
4,109,200 8/1978 McNulty ......................... 318/657 X
4,140,998 2/1979 Bettle .............................. 318/657 X
4,450,443 5/1984 Dolland ........................... 318/657 X
4,456,863 6/1984 Matusek .......................... 318/632 X

FOREIGN PATENT DOCUMENTS 1319586 6/1973 United Kingdom ................ 318/653

*Primary Examiner*—Bentsu Ro
*Attorney, Agent, or Firm*—Barnes & Thornburg

[57] ABSTRACT

A drive and position sensor having a drive shaft for positioning a driven part and connected to a magnetic core by a reduction gear to position the core axially relative to a primary and secondary coil so that the voltage in the secondary coil is a measure of the position of the driven part.

12 Claims, 5 Drawing Sheets

DRIVE AND POSITION SENSOR FOR A DRIVEN PART

BACKGROUND AND SUMMARY OF THE INVENTION

The present invention relates generally to a drive, particularly for a door mechanism, and more specifically to a drive having a sensor for the position of the driven parts, particularly doors.

When many parts are driven, different switching Processes must be triggered at different positions, just as in the case of driven doors, in order to accelerate or delay the respective driving movement or the like. In addition, the drive must stop when indicated end positions are reached.

For the mentioned switching processes of previous drives, different limit switches and sensors are mounted at different positions that must be indicated for a specific application. In the case of a door drive, for example, the mounting of a total of seven limit switches or sensors may be necessary that are actuated by door wings or parts connected with said door wings. This is considerably difficult, since the positions of the switches or sensors must be fixed in advance. An arrangement at a different point is time-consuming and costly.

In addition, drives for doors are known that, via auxiliary gears, are coupled with potentiometers. The resistance varies when the drive is moved and forms an analog signal for the position of the driven doors and parts.

Finally, it is known to arrange pulse generators driven by the drives that are coupled with counters or the like in order to form, from the number of received pulses, a signal for the position change of the driven doors and parts.

The above-described systems require improvements to the extent that they are costly with respect to manufacturing and work with parts that are subjected to a relative amount of wear. In the case of the pulse-generator/counter combination, the respective existing information concerning the momentary position of the driven parts is destroyed as a rule in the case of a power failure. Thus, when the power is switched on again, the system does not "know" where the driven parts are located.

It is therefore the objective of the invention to provide a drive, particularly a door drive, that operates with parts that are extremely free of wear and in any operational phase, completely irrespectively of the type of the preceding operational phases or breakdown periods, is able to generate a signal that reflects the respective position of the driven parts.

This objective is achieved by a driving element for a driven part that axially adjusts a softly magnetic core via a reducing gear relative to a concentric coil arrangement. The coil arrangement consisting at least of a primary coil that can be connected to an alternating voltage as well as of a secondary coil that has the same axis as the primary coil, at which a secondary voltage can be tapped that depends on the position of the core.

The secondary voltage therefore furnishes a signal for the actual position of the driven parts and not only a signal for their position changes. This signal will be immediately and directly available again after a power outage when the power supply is switched on again.

The electric circuit parts of the arrangement according to the invention are completely free of wear. In this case, it is a special advantage that the secondary voltage clearly changes even in the case of small changes of the position of the core. As a result, it is easily possible to couple the core at a high reduction with respect to the drive. Thus, a long path of travel of the doors and parts that are actuated by the drive corresponds to only a slight adjustment or movement of the core, which produces a clearly distinguishable secondary voltages. The arrangement according to the invention is therefore suitable for the monitoring of particularly long regulating distances.

Another special advantage of the invention is the fact that a change of the driving movements alone can take place by a correspondingly changed programming of a control or regulating circuit assigned to the drive, without a changed mounting of the core arrangement or of the core. This offers the possibility of being able to adapt the drive according to the invention without any mechanical changes to different usages.

According to a preferred embodiment of the invention, the reduction gear, which includes a threaded bushing and a threaded part, is arranged as the driving connection between a rotating part, such as a shaft, the drive and the core.

In a particularly preferred embodiment of the invention, the coil arrangement may in this case be arranged with the core inside an axial recess of a shaft or within a wheel of the drive. In this case, the shaft or the wheel may consist of a ferromagnetic material, such as steel or the like. This type of material is even desirable in view of an effective shielding of the coil arrangement toward the outside.

The arrangement of the coils and of the core within the shaft or the like, is such that the coil arrangement is held in the shaft or the like by a carrier shell which is fastened on the outside of one axial end of the shaft or the like at a housing of the drive. The core or a portion of said core a non-circular cross-section and is guided axially slidably, but non-rotatably in a guide bushing that is arranged at the free end of the carrier shell within the shaft or the like. Within the other end of the shaft or the like, a threaded bushing is arranged that does not rotate with respect to the shaft or the like and interacts with a threaded part that can be screwably slid in it is fixedly connected with the core. As a result, an extremely space-saving arrangement can be obtained.

The threaded part is biased by a spring in one axial direction, so that the threaded bushing and the threaded part can continuously interact with one another without play. In this case, the spring may be clamped under pressure between the threaded part and the guide bushing.

In the case of a unintended, extreme axial shifting of the threaded part, the spring disengages the threaded part and engages the threaded bushing, thereby relieving the threaded part from the pressure of the spring. At the same time, another spring can become effective and try to force the threaded part in the direction of the first spring. This arrangement has the advantage that the threaded part in extreme axial positions, when the threads of the threaded part and of the threaded bushing no longer engage, is forced by means of spring force into the direction of the threaded bush. Thus, when the shaft is rotated in the corresponding direction, is again screwed into the threaded bush.

The secondary voltage can be converted into different signals corresponding to the position of the driven doors or parts.

The secondary voltage, if necessary after a rectification or smoothing, can be fed to an evaluating circuit having a plurality of adjustable comparators set for differing levels of voltage to determine the differing positions of the driven parts from the output signals of the different comparators.

Alternatively, the secondary voltage, that may be smoothed and rectified, may also be fed to an analog-digital converter so that a digital signal is available for the momentary position of the driven parts.

As another alternative, the secondary voltage may be fed to an evaluating circuit that, generates an output voltage with a level that is an analog to the secondary voltage. As a result, a correspondingly changed current can be impressed on a resistor that is connected to the output. This current may be added to the consumption of the evaluating circuit for example, in that the evaluating circuit is, in series with a resistor, connected to a power supply system, and the mentioned output, via the resistor connected on the outlet side, is connected with a supply line of the evaluating circuit. In the case of this arrangement, a voltage that changes with the level of the output also changes across the resistor that is located in series with the evaluating circuit. The advantage of this arrangement is that the position of the driven doors or driven parts can be tapped away from the evaluating circuit via a supply line of the evaluating circuit, for example, by the determination of the voltage across the resistor that is arranged in series with the evaluating circuit. Thus, when the signals are processed away from the evaluating circuit, no separate measuring lines or the like are required in addition to the supply lines. In addition, it is advantageous that extremely high or low voltage drops occur across the resistor that is located in series with the evaluating circuit, when a short circuit is present in the evaluating circuit or a line breakage in the supply lines. As a result, it can be continuously checked whether the evaluating circuit works correctly or not.

Other objects, advantages and novel features of the present invention will become apparent from the following detailed description of the invention when considered in conjunction with the accompanying drawings.

DETAILED DESCRIPTION OF THE DRAWINGS

Figure 1:
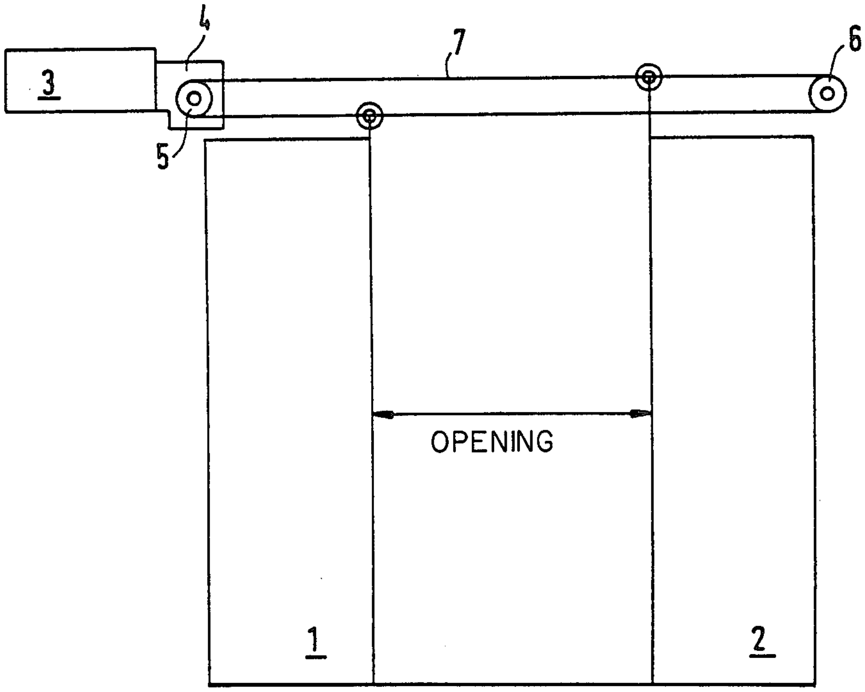
FIG. 1 is a diagrammatic representation of a door drive.

FIG. 1 shows a sliding door with two wings 1 and 2 that are arranged so that they can be slid in guide rails that are not shown. An electric motor 3 drives the wings 1 and 2, via a gear 4, for example a worm gear, and a driving wheel or a pulley 5. A belt 7 is driven by the driving wheel 5 and idle or undriven wheel 6. The lower end of belt 7 is connected with the wing 1, and the upper end of belt 7 is connected with the wing 2. Accordingly, the wings 1 and 2, depending on the rotating direction of the belt 7, move toward one another to close the door or away from one another to open the door.

Figure 2:
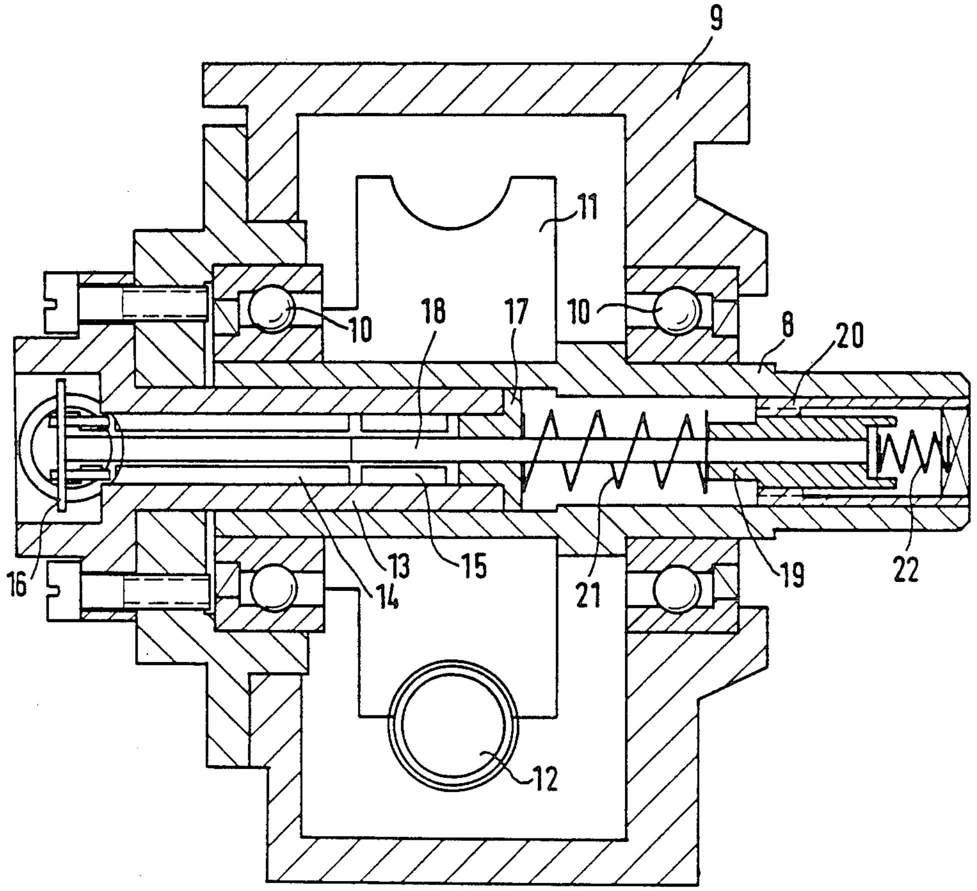
FIG. 2 is an axial sectional view of the output shaft of the door drive as well as of the gearbox in the area of the bearings of the output shaft incorporating the principles of the present invention.

FIG. 2 shows the output shaft 8 of the gear 4. The pulley 5 of FIG. 1, that is to be arranged on the end of the output shaft 8 that is on the right in FIG. 2, is not shown.

The output shaft 8 is a hollow shaft axially and radially disposed, by means of deep-groove ball bearings 10 or the like, in a housing 9 that is open at both ends of the output shaft 8. A worm wheel 11 is mounted torsionally fixed on the output shaft 8 and interacts with a worm 12 driven by the electric motor 3.

From the direction of the front end of the shaft 8 that is on the left in FIG. 2, a carrier shell 13 extends into the hollow space of the shaft 8. A flange on the carrier shell 13 is screwed to the housing 9 on the side that is on the left in FIG. 2. A primary coil 14 as well as a secondary coil 15 are arranged axially behind one another coaxially inside the carrier shell 13. The coils 14 and 15 are connected electrically with supply and evaluating circuits that are arranged on a printed circuit board 16. The printed circuit board 16 is housed in a protected way at the left end of the carrier shell 13. A ring-shaped collar that is molded onto the flange of the carrier shell 13 encloses a space for the printed circuit board 16 that is accessible from the end of the carrier shell 13 that is on the left in FIG. 2.

A guide bushing 17 that has an axial central opening with a non-circular cross-section is fastened at the end of the carrier shell within the output shaft 8 that is on the right in FIG. 2.

The axial central opening of the guide bushing 17 is penetrated by a rod-shaped core 18 made of a softly magnetic material. The core 18 has a non-circular cross-section that is received in the corresponding cross-section central opening of the guide bushing 17, to slide axially but not rotationally with respect to the guide bushing 17, carries shell 13 and housing 9. In addition, the cross-section of the core 18 is dimensioned so that the end of the core 18, that is on the left in FIG. 2, can be pushed into the coils 14 and 15.

The end of the core 18 that is on the right in FIG. 2 is fastened inside a threaded part 19 that is provided with an external thread so that the core 18 and the threaded part 19 cannot be rotated or axially slid with respect to one another.

The threaded part 19 is screwably received in a threaded bushing 20 which itself is arranged fixedly inside the end of the hollow shaft 8 that is on the right in FIG. 2 so that it cannot be rotated and axially slid relative to the hollow shaft 8. Correspondingly, the thread part 19 and the core 18 slide to the right or the left in FIG. 2 depending on the rotating direction of the hollow shaft 8 and the threaded bushing 20 that is fixedly connected with it.

A compression spring 21, clamped between the threaded part 19 and the guide bushing 17, tries to force the thread part 19 to the right in FIG. 2 so that the threads of the threaded part 19 and the threaded bushing 20 can interact with one another without play.

When the threaded part 19 in FIG. 2 is shifted extremely far to the right, the right end of the compression spring 21 disengages from threaded part 19 and engages the facing front side of the threaded bushing 20.

Thus the threaded part 19 is relieved from the force of the spring 21. At the same time, an additional spring 22 becomes effective or increasingly loaded. The spring 22 is clamped in between the right front end of the threaded part 19 and a counterbearing fastened in the hollow shaft 8. On the basis of this arrangement, it is ensured that the threaded part 19 is forced by one of the springs 21 and 22 in a direction to reestablish the engagement of the threads of the threaded part 19 and of the threaded bushing 20, if they should have become disengaged by unintended extreme axial shifting of the thread part 19.

The described arrangement operates as follows:

When the shaft 8 rotates into one or the other direction, the core 18 is axially shifted so that the end of the core 18 that is on the left in FIG. 2, takes up different positions with respect to coils 14 and 15. This changes the inductive coupling between coils 14 and 15. If an alternating current is applied to the primary coil 14, a secondary voltage can be tapped at the secondary coil 15, the level of which depends on the position of the core 18. Even small position changes of the core 18 cause clear changes of the level of the signal in the secondary coil 15.

Figure 3:
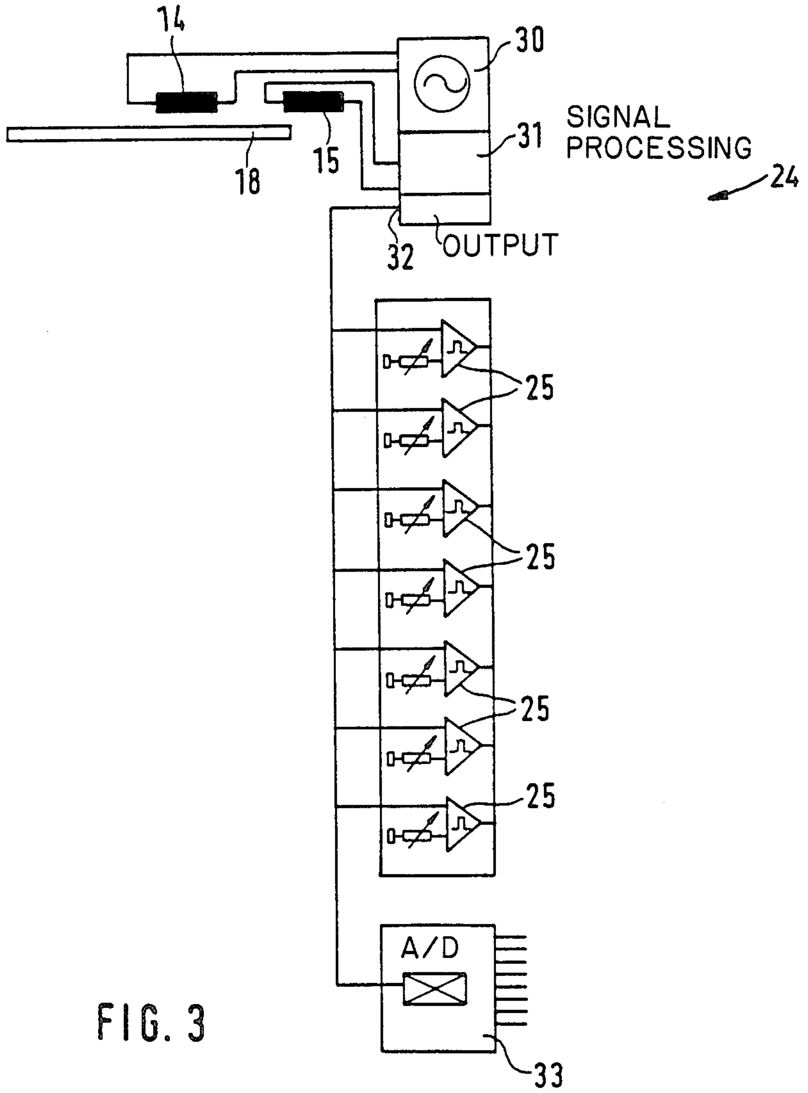
FIGS. 3 and 4 are diagrammatic representations of preferred embodiments of an evaluating circuit.
Figure 4:
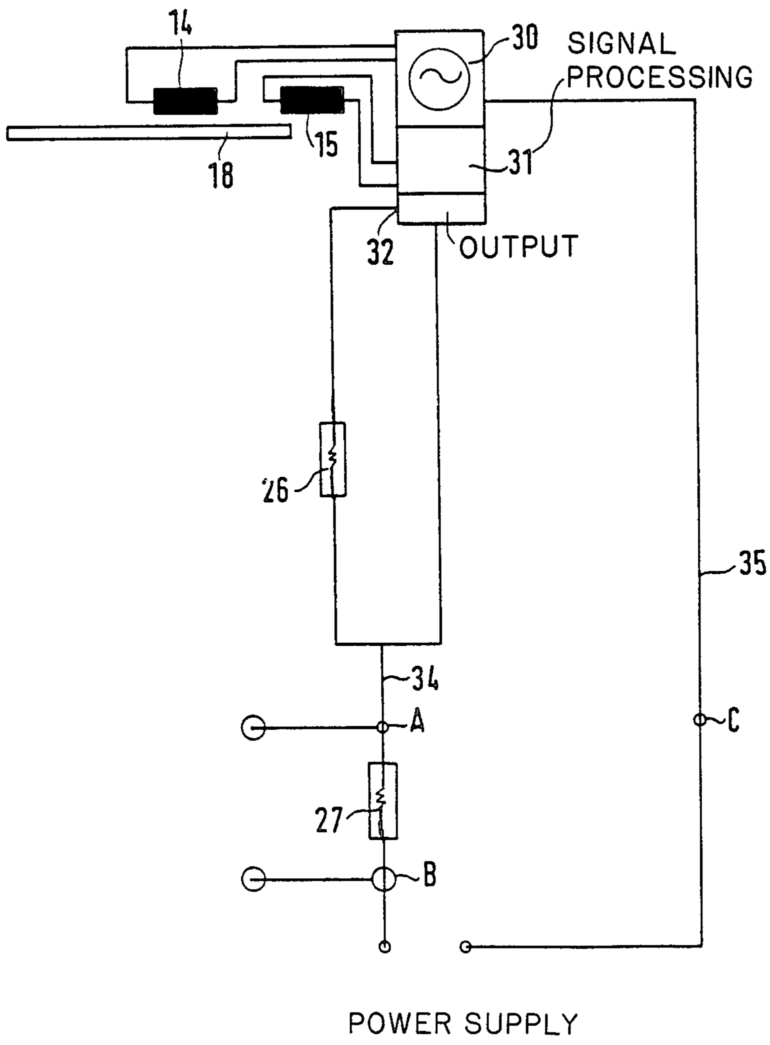

Examples of the electric circuit of coils 14 and 15 are shown in FIGS. 3 and 4.

According to FIG. 3, coils 14 and 15 interact with an evaluating circuit 24 which, if necessary, may be housed completely on a printed circuit board 16 of FIG. 2.

The evaluating circuit includes a sine wave generator 30 that supplies the primary coil 14 and is connected with a constant alternating voltage, not shown. The secondary coil 15 is connected with a signal processing circuit 31 that, among other things, rectifies and smoothes the secondary voltage tapped from the secondary coil 15 and to place an output on connection 32 at an electric level that changes according to the respective secondary voltage. This level therefore represents an analog signal for the position of the core 18.

According to a first variant, the output connection 32 may be connected with an analog-digital converter 33 that converts the changing level analog signal of the output connection 32 into digital signals that are then supplied to the inputs of a computer that is not shown for the computer-assisted control of the drive.

Instead of the analog-digital converter 33, a plurality of comparators 25 are provided having one input connected with the output connection 32. The other input of the comparalors 25 are connected to a different adjustable reference voltages so that each comparator 25 senses a different level of the output connection 32. Different positions of the core 18 are correspondingly reflected by the fact that different comparators 25 switch over.

In the case of the embodiment according to FIG. 4, a precision resistor 27 is arranged in series in the supply lines 34 and 35 that are used for the joint power supply of the sine wave generator 30 and the signal processing circuit 31. In addition, the output connection 32 is connected with the supply line 34 via a resistor 26 between the precision resistor 27 and the signal processing circuit 31. Correspondingly, a differing current is fed through the resistor 26 depending on the voltage level of the output connection 32. This results in a different voltage across the precision resistor 27 as a function of the level at the output connection 32, which may, for example, be evaluated by a measuring device connected at Points A and B.

The differing voltage across the precision resistor 27 is based on the fact that the sine wave generator 30 as well as the signal processing circuit 31, together with the resistor 26, form an electric network that, with respect to Points A and C, may be considered a two-terminal network. Depending on the level of the output connection 32, a different voltage drop will occur across Points A and C. Since, the sum of the voltage drops between Points A and B, and A and C, corresponds to the terminal voltage of the power supply, the described voltage drops that depend on the position of the core 18, occur at the precision resistor 27.

A special advantage of the arrangement according to FIG. 4 is that the precision resistor 27 can be arranged away from the sine wave generator 30, the signal processing circuit 31 as well as the resistor 26. Thus, the signal that depends on the position of the core 18, namely voltage drop across the precision resistor 27, can be available at a very large distance from the gear part shown in FIG. 2. In addition, only two electric connections of the circuit board 16 to the outside are required, because the sine wave generator 30, the signal processing circuit 31 and the resistor 26 of FIG. 4, can be housed completely on the printed circuit board 16.

The secondary voltage at the secondary coil 15 does not change linearly with the shifting of the core 18. Thus, the signals derived from the secondary voltage and provided at output connection 32 in FIGS. 3 and 4, as a rule, also do not change linearly with the shifting of the core 18.

Nevertheless, it is easily possible to calibrate the arrangement in such a way that the respective position of the core 18 can be represented in a display or the like.

One input of the comparators 25 in FIG. 3, for this purpose, is connected with adjustable potentiometers or other circuit elements, that are able to generate an adjustable reference voltage. Thus, the possibility exists to compensate the reference voltages with respect to the non-linear relationship between the shifting of the core 8 and the secondary voltage that can be tapped at the coil 15, so that the comparators 25 in each case switch over one after the other when the core 18 is pushed further by a measurement that can be indicated. The number of the respectively switched-over comparators 25 is in each case proportional to the shifting path of the core 18. Thus in a very simple way, a measuring display can be generated for the position of the core 18. For example, the comparators 25 may interact with illuminated displays (or other lighting elements) that are arranged next to one another in a line-type series. One illuminating diode or the like is assigned to and switched on and off by each comparator 25. Correspondingly, in each case a different number of illuminating diodes or the like lights up, when the core 18 takes up different positions relative to a zero position. In the case of a corresponding arrangement of the illuminating diodes or the like, an illuminating strip or the like is generated of a differing length.

In the case of an arrangement of an analog-digital converter 33 of FIG. 3, a programmable computer may be part of said converter or separate from said converter 33 to control a corresponding measuring display, such as an arrangement of illuminating diodes, using a signal assigned to each level of the output 32, corresponding to the actual position of the core 18.

The corresponding situation exists for the arrangement according to FIG. 4. The voltage drop across the precision resistor 27, as a rule, is not linear with the shifting of the core 18. However, this voltage, again in a basically identical way as the secondary voltage of coil 15 in FIG. 3, can be converted into signals that indicate the respective actual position of the core 18. For example, the voltage across the precision resistor 27 can be supplied to the comparator arrangement shown in FIG. 3 which for this purpose can be connected at the circuit point A. In the case of a corresponding calibrating of the potentiometer and reference voltage sources assigned to the individual comparators, the shifting distance of the core 18 is again proportional to the number of switched-over comparators.

In addition, the input of the analog-digital converter 33 may be connected at the circuit point A so that, in the case of a combination of this converter with a programmable computer, output signals can be generated that are linear representations of the shifting of the core 18.

Deviating from the arrangement shown in FIGS. 2 to 4, where one secondary coil 15 is arranged, several secondary coils may also be arranged, in which case different circuit connections are possible. Thus the secondary coils may be connected in series in order to be able to tap an overall voltage at the secondary coil arrangement that corresponds to the sum of the secondary voltages of the individual secondary coils. Instead, a bridge connection is also possible if it is to be possible to tap a voltage at the secondary coil arrangement that corresponds to the difference of the secondary voltages of two secondary coils. However, all these embodiments correspond basically to the shown embodiment because the voltage that in each case can be tapped at the secondary coil arrangement is changed by the shifting of the core 18.

Figure 5:
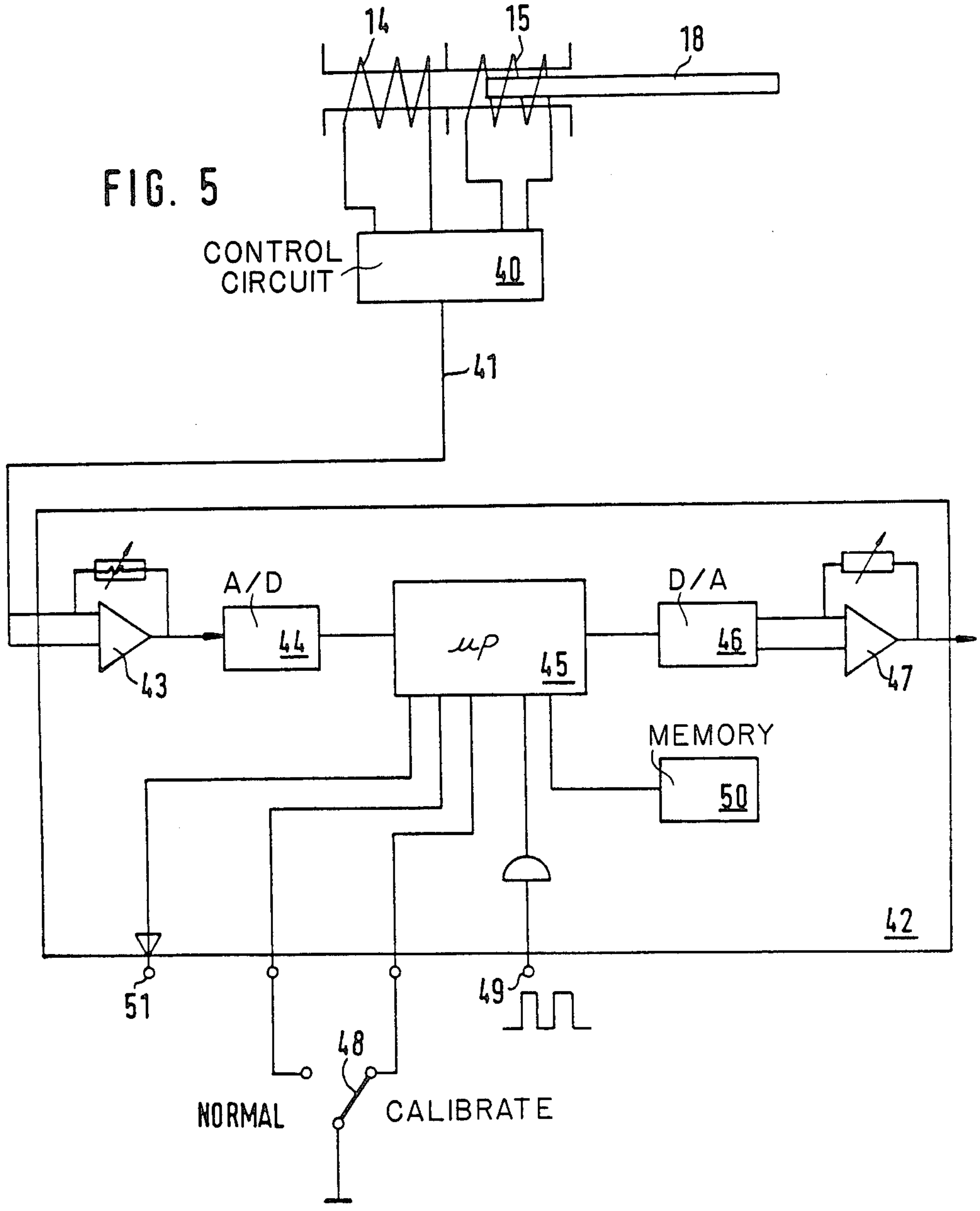
FIG. 5 is a circuit for the calibrating of the measuring output.

FIG. 5, shows the primary coil 14 as well as the secondary coil 15 and the shiftable core 18. An integrated control circuit 40 supplies the primary coil 14 with a sinusoidal alternating voltage. The input of the integrated control circuit 40 is connected with the secondary coil 15. As a function of the alternating current induced into the secondary coil which corresponds to the position of the core 18, the integrated control circuit 40 generates as its output a direct current with a different level that is supplied via an output line 41 to a calibrating circuit 42. The calibrating circuit 42 comprises an input amplifier 43 with an adjustable feedback that is used for the adaptation of the level of the voltage of line 41. The output of the input amplifier 43 is connected with an analog-digital converter 44 that generates an output digital signal that corresponds to the output level of the input amplifier 43. The digital output signal is processed further by a microprocessor 45. The processed signal will then be supplied to a digital-analog converter 46 so that the signal that is processed by the microprocessor 45 is again available in analog form. This analog signal will then be supplied to an output amplifier 47 with an adjustable feedback so that the output of the amplifier 47 can be connected to a display apparatus, such as a hand-indicator instrument.

To assure that the measuring display of the display instrument is exactly linear with respect to the shifting path of the core 18, the following may take place:

First, a selector switch 48 is set from "normal" to "calibrate". This selector switch 48 is connected with command inputs of the microprocessor 45.

Then the core 18 is slowly moved from one end position to the other end position, while, at the same time, a pulse input 49 of the microprocessor 45 is driven by pulses, the number of which is exactly proportional to the respective covered path of the core 18. For the generating of these pulses, a pulse generator may be used that is driven, for example, by the output shaft 8 (compare FIG. 2).

The microprocessor 45 stores the pulse numbers together with the corresponding values of the digital output signals of the analog-digital converter 44. Namely, the respective output signals are assigned to a number or pulse count, that is proportional to the covered path of the core 18 and is therefore a measurement for the respective position of the core 18. For the storage, a nonvolatile storage or memory means is used, such as an E-Prom 50 that is connected with an output of the microprocessor 45.

Now when the selector switch 48 is changed over to the "normal" position, the microprocessor 45 compares the output signals from the analog-digital converter 44 with the stored signals in the storage means, wherein a number or pulse count is assigned that precisely reflects the position of the core 18. When an output signal of the analog-digital converter 44 corresponds to a stored signal, the microprocessor supplies a digital signal to the digital-analog converter 46 that represents the respective assigned number or pulse count. Correspondingly, the digital-analog converter, generates an output analog signal that rises or falls linearly with the shifting of the core 18.

The calibrating circuit 42 can carry out a corresponding calibration for any combination consisting of coils 14, 15, the core 18 and the integrated control circuit 40. Thus any arrangement can be calibrated separately in order to compensate all mechanical imprecisions. The stored pairs of corresponding values; i.e., the pulse numbers and output signals of the analog-digital converter 44 that are assigned to one another, may be retrieved at an output 51.

The drive according to the invention is also well suitable for machine tools.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A drive and sensor for positioning and sensing the position of driven parts comprising:
- a stationary housing;
- a drive means including a rotating output shaft having an axial recess for positioning a driven part;
- primary and secondary coaxial coils in said axial recess;
- magnetic core inside said axial recess and movable along the axis of and across said coils;
- a reducing gear means including a threaded bushing and a threaded part threadably interacting for converting rotary motion of said shaft to axial motion of the core with respect to said coils to generate a voltage in said secondary coil corresponding to the position of said driven part when alternating voltage is applied to said primary coil;
- means for mounting said threaded bushing to rotate with said shaft; and
- means for mounting said coils and threaded part rotationally stationary with respect to said housing.

2. A drive and sensor according to claim 1, including an evaluating means connected to said secondary coil for converting an output voltage of said secondary coil to a driven part position signal.

3. A drive and sensor according to claim 2, wherein said evaluating means includes a plurality of adjustable comparator means for comparing the output voltage of said secondary coil to a different reference signal respectively.

4. A drive and sensor according to claim 2, wherein the evaluating means includes a resistor connected in series with a power supply line of the evaluating means, and means for applying output voltage of the secondary coil to said resistor.

5. A drive and sensor according to claim 4, including a precision resistor in series with said evaluating means and said power supply line.

6. A drive and sensor according to claim 2, wherein said evaluating means includes a programmable computer for comparing actual output voltage of said secondary coil with presettable values of the output voltage of the secondary coil and providing a measured value for the positions of the core, corresponding to a matched preset value of output voltage.

7. A drive and sensor according to claim 2, wherein said evaluating means includes a first and second power supply input and an output for said driven part position signal;

a first resistor connected between said output and said first power supply input;

a precision resistor connected in series with said first power supply input and a power supply, said precision resistor having two connecting points to which measuring device can be connected to measure said driven part position signal.

8. A drive and sensor for positioning and sensing the position of driven parts comprising:

a housing;

a driving means including a hollow shaft having first and second ends for positioning a driven part;

primary and secondary coaxial coils;

a carrier shell fastened to said housing adjacent said first end of said hollow shaft and extending with said primary and secondary coils mounted thereon into said hollow shaft;

a guide bushing mounted to said carrier shell and having a non-circular cross-section opening;

a magnetic core movable along the axis of and across said coils, and having non-circular cross-section extending through said opening of said guide bushing so as to move axially and not rotationally with respect to said guide bushing and said carrier shell; and a reducing gear means connected said hollow shaft and said core for axially adjusting said core with respect to said coils in response to said driving means to generate a voltage in said secondary coil corresponding to the position of said driven part when alternating voltage is applied to said primary coil.

9. A drive and sensor according to claim 8, wherein said reducing gear means includes a threaded bushing fixedly mounted to said shaft at said second end and a threaded part fixedly mounted to said core and threadably interacting with said threaded bushing.

10. A drive and sensor according to claim 9, including a spring biasing said threaded part in an axial direction towards said threaded bushing.

11. A drive and sensor according to claim 10, wherein said spring is clamped in between the threaded part and the guide bushing.

12. A drive and second according to claim 11, wherein the spring disengages said threaded part and engages the threaded bushing during an extreme axial shifting of the thread part, and including an additional spring biasing the threaded part in the direction opposite the first spring.

* * * * *